US012756358B2

(12) United States Patent
Bhasin et al.

(10) Patent No.: US 12,756,358 B2
(45) Date of Patent: Oct. 6, 2026

(54) SYSTEM AND METHOD FOR IDENTIFYING DEFECTIVE SOLAR PANELS AND TO QUANTIFY ENERGY LOSS

(71) Applicant: International Business Machines Corporation, Armonk, NY (US)

(72) Inventors: Sanjay Bhasin, Gurugram (IN); Puneet Singh Jaggi, Ahmedabad (IN); Ram Menon, Ahmedabad (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 18/688,168

(22) PCT Filed: Sep. 1, 2022

(86) PCT No.: PCT/IB2022/058211
§ 371 (c)(1),
(2) Date: Feb. 29, 2024

(87) PCT Pub. No.: WO2023/031843
PCT Pub. Date: Mar. 9, 2023

(65) Prior Publication Data

US 2025/0125769 A1 Apr. 17, 2025

(30) Foreign Application Priority Data

Sep. 1, 2021 (IN) ............................. 202121039630

(51) Int. Cl.
*H02S 50/15* (2014.01)
*G06T 3/4038* (2024.01)
*G06T 7/00* (2017.01)

(52) U.S. Cl.
CPC ............ *H02S 50/15* (2014.12); *G06T 3/4038* (2013.01); *G06T 7/0002* (2013.01);
(Continued)

(58) Field of Classification Search
CPC ......... G06T 3/4038; G06T 2207/10032; G06T 2207/10048; G06T 2200/32; G06T 1/00;
(Continued)

(56) References Cited

U.S. PATENT DOCUMENTS 10,313,575 B1 * 6/2019 Wingo .................. B64U 10/00
2018/0003656 A1 * 1/2018 Michini ................ G01N 25/72
(Continued)

FOREIGN PATENT DOCUMENTS

CN 112200764 A * 1/2021 .......... G06F 18/241
EP 4396766 A1 7/2024
(Continued)

OTHER PUBLICATIONS

Hoegner et al., Extraction of Solar Cells From UAV-Based Thermalimage Sequences, ISPRS Annals of the Photogrammetry, Remote Sensing and Spatial Information Sciences, vol. IV-1, 2018, pp. 69-75, doi: 10.5194/isprs-annals-IV-1-69-2018.*
(Continued)

*Primary Examiner* — Guillermo M Rivera-Martinez
(74) *Attorney, Agent, or Firm* — Michael A. Petrocelli

(57) ABSTRACT

There is disclosed a system for performance monitoring of at least one solar panel of a solar power plant, comprising at least one aerial vehicle communicably coupled with a data-processing arrangement, wherein the data processing arrangement is configured to receive visual images and thermographic images of the at least one solar panel; stitch the visual images and the thermographic images to create an visual orthomosaic image and a thermographic orthomosaic image respectively; create visual and radiometric signatures solar panels using the visual orthomosaic image and the thermographic orthomosaic image respectively; create at least one table in the thermographic orthomosaic image; create a table-to-string mapping; identify at least one defect
(Continued)

in the solar panels based on the visual signatures and the radiometric signatures; calculate energy loss in each of the at least one string in the solar power plant.

18 Claims, 9 Drawing Sheets

(52) U.S. Cl.
CPC ............... *G06T 2207/10032* (2013.01); *G06T 2207/10048* (2013.01); *G06T 2207/20081* (2013.01); *G06T 2207/20212* (2013.01)

(58) Field of Classification Search
CPC .......... G06T 2207/30184; G06V 20/10; G06V 20/17; G06V 10/16
See application file for complete search history.

(56) References Cited

U.S. PATENT DOCUMENTS

| | | | | |
|---|---|---|---|---|
| 2018/0266887 A1* | 9/2018 | Frank | ........................ | G01J 5/00 |
| 2020/0082168 A1* | 3/2020 | Fathi | ........................ | G06T 7/521 |
| 2021/0126582 A1* | 4/2021 | Shue | ........................ | H02S 50/15 |

FOREIGN PATENT DOCUMENTS

| | | | | | |
|---|---|---|---|---|---|
| KR | 101832454 | B1 * | 4/2018 | ............. | G01S 19/14 |
| KR | 102217549 | B1 * | 2/2021 | ........... | B64C 39/024 |
| KR | 20210102029 | A * | 8/2021 | ............. | B64U 50/19 |
| KR | 20210102031 | A * | 8/2021 | ............. | B64U 20/87 |
| WO | 2017155421 | A1 | 9/2017 | | |
| WO | 2021113268 | A1 | 6/2021 | | |
| WO | 2023/031843 | A1 | 3/2023 | | |

OTHER PUBLICATIONS

V. de Oliveira, et al., Evaluation of Faults in a Photovoltaic Power Plant using Orthomosaics based on Aerial Infrared Thermography, 2021 IEEE 48th Photovoltaic Specialists Conference (PVSC), Fort Lauderdale, FL, USA, 2021, pp. 2604-2610, doi: 10.1109/PVSC43889.2021.9.*

Zefri et al., In-depth investigation of applied digital photogrammetry to imagery-based RGB and thermal infrared aerial inspection of large-scale photovoltaic installations, Remote Sensing Applications: Society and Environment, vol. 23, 2021, pp. 1-14, doi: 10.1016/j.rsase.2021.100576.*

Zefri et al., Inspection of Photovoltaic Installations by Thermovisual UAV Imagery Application Case: Morocco, 2017 International Renewable and Sustainable Energy Conference (IRSEC), Tangier, Morocco, 2017, pp. 1-6, doi: 10.1109/IRSEC.2017.8477241.*

Vega Díaz et al., Solar Panel Detection within Complex Backgrounds Using Thermal Images Acquired by UAVs, Sensors, 2020, 20(21):6219, pp. 1-16, doi: 10.3390/s20216219.*

Cardinale-Villalobos et al., Solar panel failure detection by infrared UAS digital photogrammetry: a case study, International Journal of Renewable Energy Research, vol. 10, No. 3, Sep. 2020, pp. 1154-1164.*

Zefri, Y. et al., Thermal Infrared and Visual Inspection of Photovoltaic Installations by UAV Photogrammetry—Application Case: Morocco,Drones 2018, 2, 41, pp. 1-24, doi: 10.3390/drones2040041.*

De Oliveira Aline Kirsten Vidal et al., "Evaluation of Faults in a Photovoltaic Power Plant using Orthomosaics based on Aerial Infrared Thermography", 2021 IEEE 48th Photovoltaic Specialists Conference (PVSC), Fort Lauderdale, FL, USA, 2021, pp. 2604-2610, doi: 10.1109/PVSC43889.2021.9518541.

European Patent Office, "EP Extended European Search Report", Jul. 31, 2025, 07 pages, EP Application No. 22863760.9.

International Search Report and Written Opinion issued for International Patent Application PCT/IB2022/058211, on Dec. 6, 2022, 11 Pages.

* cited by examiner

701

702

SYSTEM AND METHOD FOR IDENTIFYING DEFECTIVE SOLAR PANELS AND TO QUANTIFY ENERGY LOSS

FIELD OF INVENTION

In general, the present disclosure relates to a system for performance monitoring of at least one solar panel of a solar power plant for identifying the power losses. Particularly, the present disclosure relates to a system that detects defective solar panel(s) of a solar power plant and to quantify energy loss attributable to each of the detected defective solar panel(s), in terms of kWh per unit of time. Additionally, the present disclosure relates to a method for performance monitoring of at least one solar panel(s) of a solar power plant and to quantify energy loss attributable to each of the detected defective solar panel(s), in terms of kWh per unit of time.

BACKGROUND

As the population of the world is increasing, the energy consumption and energy demand is also increasing day by day. Conventionally, hydrocarbons and coal are the most widely used source of energy throughout the globe. However, such conventional sources of energy cause a lot of pollution, thus, the world is putting efforts to harnessing energy from the non-conventional energy sources. The solar power in the form of sunlight, is the most attractive non-conventional source of energy as the earth receives inexhaustible sunlight in abundant amount. Commercial solar power plants are being established worldwide to make a significant shift toward solar energy. A solar power plant comprises an array of solar cells and/or photovoltaic cells, wherein the photovoltaic cells are the devices that convert light into electric current using photovoltaic effect. The array of solar cells produces direct current (DC) which is converted into Alternating current (AC) using inverters. The solar power plants generally have huge number of solar panels spread across a big geographical area. Such a large-scale operation of a solar power plant poses problems in fault management and maintenance of the power plant. Various equipment (e.g. inverters) used in the Solar Power Plant raises an alert (or an alarm) in response to the detection of some type of malfunctioning. However, a major source of under-performance in solar power plants is due to faults that do not generate any alarm. The entire solar power plant just continues to quietly underperform without giving any alert or alarm of any sort. Soiling losses is one such example of under-performance. There is a similar category of loss that originates from defects in solar panels (e.g. hotspots, bypass diode active etc.). Such category of losses is termed as systemic losses. It is very difficult to detect fault(s) (faults in this document implies faults as the defects which are not reported by inverters as well as other sources of underperformance even though there is no fault reported by any equipment, e.g. a systemic loss originating from a defective fault solar panel but it is not reported as a fault by any equipment and losses that originate from defects in the solar panels, merely results in underperformance in that inverter to which this solar panel is ultimately connected) in such a large-scale operation and the faults lead to loss in power generation. Furthermore, there are other losses related to the solar power plants e.g. radiation losses, downtime losses, soiling losses, systemic losses. The power generation of the solar power plant is also sensitive to weather conditions and it is important to segregate lower generation due to weather conditions (which is normal behaviour) from lower generation due to dust/dirt/snow accumulation on solar panels (e.g. soiling loss) or due to defects in solar panels that is not reported as a fault or an alarm but is simply observed as a minor underperformance at the inverter that the solar panel is ultimately connected to.

Currently, various performance monitoring systems are present for solar power plants which employ a model to detect power losses at the inverter level. However, the model employs comparing measured value of power with the predicted value for every inverter to detect the loss. These performance monitoring systems do not provide accurate results as the measured values of power are compared with the predicted values which are not real-time values. Such systems may provide some sense of quantum of losses, but they do not help in diagnosing on what reason contributed how much to underlying losses. Thus, there exists a need of systems which provide an automated performance monitoring to quantify and segregate different types of losses considering physical conditions of solar panels of the solar plant.

SUMMARY

An object of the present disclosure is to provide an automated system for monitoring performance of a solar power plant.

Another object of the present disclosure is to provide an automated system for detecting defective solar panel(s) of a solar power plant and to quantify/calculate energy loss attributable to each of the defective solar panel(s).

Yet another object of the present disclosure is to provide a method of (for) detecting defective solar panel(s) of a solar power plant and to quantify energy loss attributable to each of the detected defective solar panel(s).

In an aspect, embodiments of the present disclosure relate to a system for performance monitoring of at least one solar panel of a solar power plant, the system comprises:

- at least one aerial vehicle to capture visual images and thermographic images of the at least one solar panel;
- a data-processing arrangement in communication with the at least one aerial vehicle via a communication network, wherein the data processing arrangement is configured to:
  - receive visual images and thermographic images of the at least one solar panel of the solar power plant;
  - stitch the received visual images and thermographic images of the at least one solar panel to create a visual orthomosaic image and a thermographic orthomosaic image respectively;
  - create visual signatures and radiometric signatures of the at least one solar panel using the visual orthomosaic image and the thermographic orthomosaic image respectively;
  - create at least one table with coordinates in the thermographic orthomosaic image, wherein the table comprises at least one string of solar panels;
  - create a table-to-string mapping by assigning at least one string data of the at least one string of solar panels with the created at least one table;
  - identify the at least one defect in the at least one solar panel in response to the created visual signatures and radiometric signatures, by processing the at least one string data mapped in the at least one table;
  - calculate energy loss in each of the at least one string of the solar panel in the solar plant for performance monitoring of the at least one solar panel.

In another aspect, embodiments of the present disclosure relate to a method of (for) for performance monitoring of at least one solar panel of a solar power plant, the method comprising:

- capturing visual images and thermographic images of the at least one solar panel by at least one aerial vehicle;
- receiving visual images and thermographic images of the at least one solar panel of the solar power plant;
- stitching the received visual images and thermographic images of the at least one solar panel for creating a visual orthomosaic image and a thermographic orthomosaic image respectively;
- creating visual signatures and radiometric signatures of the at least one solar panel using the visual orthomosaic image and the thermographic orthomosaic image respectively;
- creating at least one table with coordinates in the thermographic orthomosaic image, wherein the table comprises at least one string of solar panels;
- creating a table-to-string mapping by assigning at least one string data of the at least one string of solar panels with the created at least one table;
- identifying the at least one defect in the at least one solar panel in response to the created visual signatures and radiometric signatures, by processing the at least one string data mapped in the at least one table;
- calculating energy loss in each of the at least one string of the solar panel in the solar plant for performance monitoring of the at least one solar panel.

The system for detecting at least one defective solar panel of a solar power plant, as disclosed herein, is of advantage that it provides an automated system for performance monitoring of a solar power plant, wherein the images of the solar panels are collected by the aerial vehicle. The aerial vehicle is either an unmanned aerial vehicle (UAV) or an aeroplane or a helicopter. The system quantifies losses experienced by each of the defect types for each of the defective solar panel. Furthermore, the data received by the system is used as a basis for replacement of defective solar panels or other corrections in the solar plant depending upon their cost-benefit analysis.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

A better understanding of the present invention may be obtained through the following examples which are set forth to illustrate but are not to be construed as limiting the present invention.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein.

Moreover, those in the art will understand that the drawings are not to scale. Wherever possible, like elements have been indicated by identical numbers.

Figure 1:
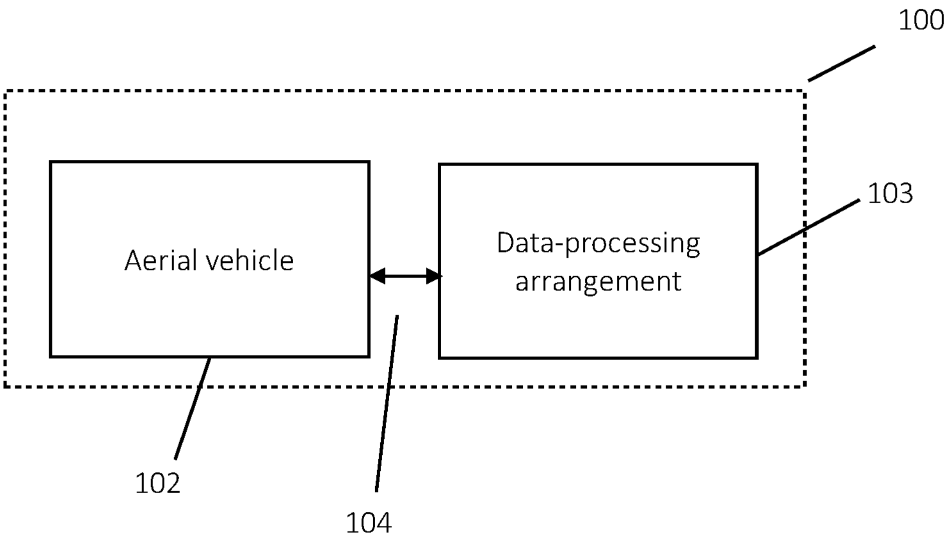
Figure 2:
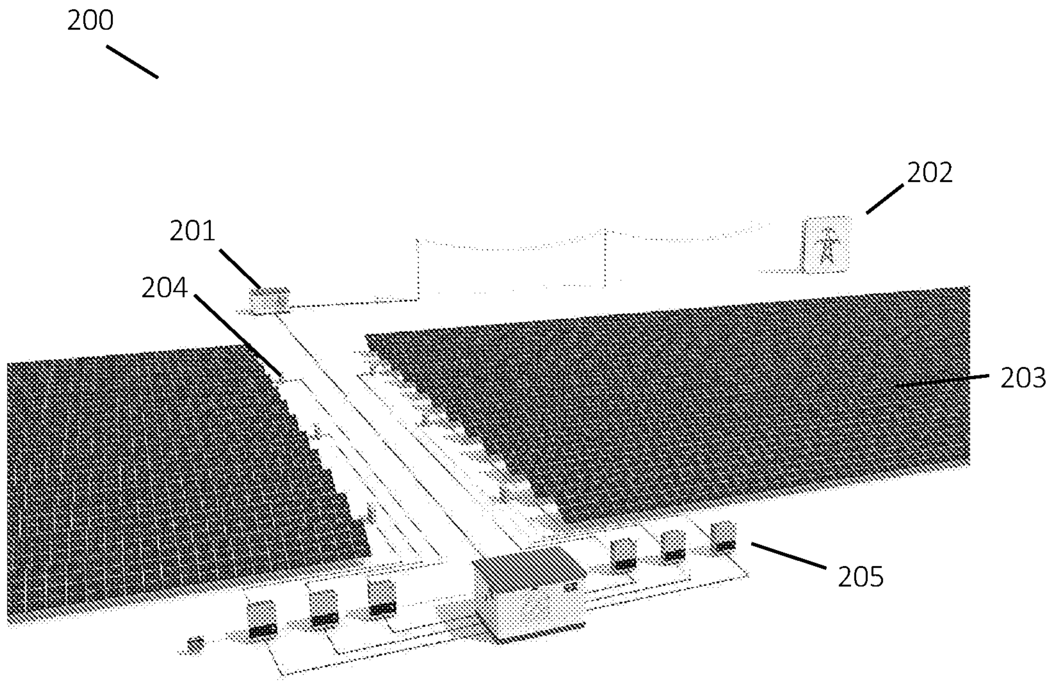

Embodiments of the present disclosure will now be described, by way of example only, with reference to the following diagrams and Tables wherein:

FIG. 1 is an illustration of a system for performance monitoring of at least one solar panel of the solar power plant, in accordance with an embodiment of the present disclosure;

FIG. 2 is an illustration of a solar power plant in accordance with an embodiment of the present disclosure.

Figure 3:
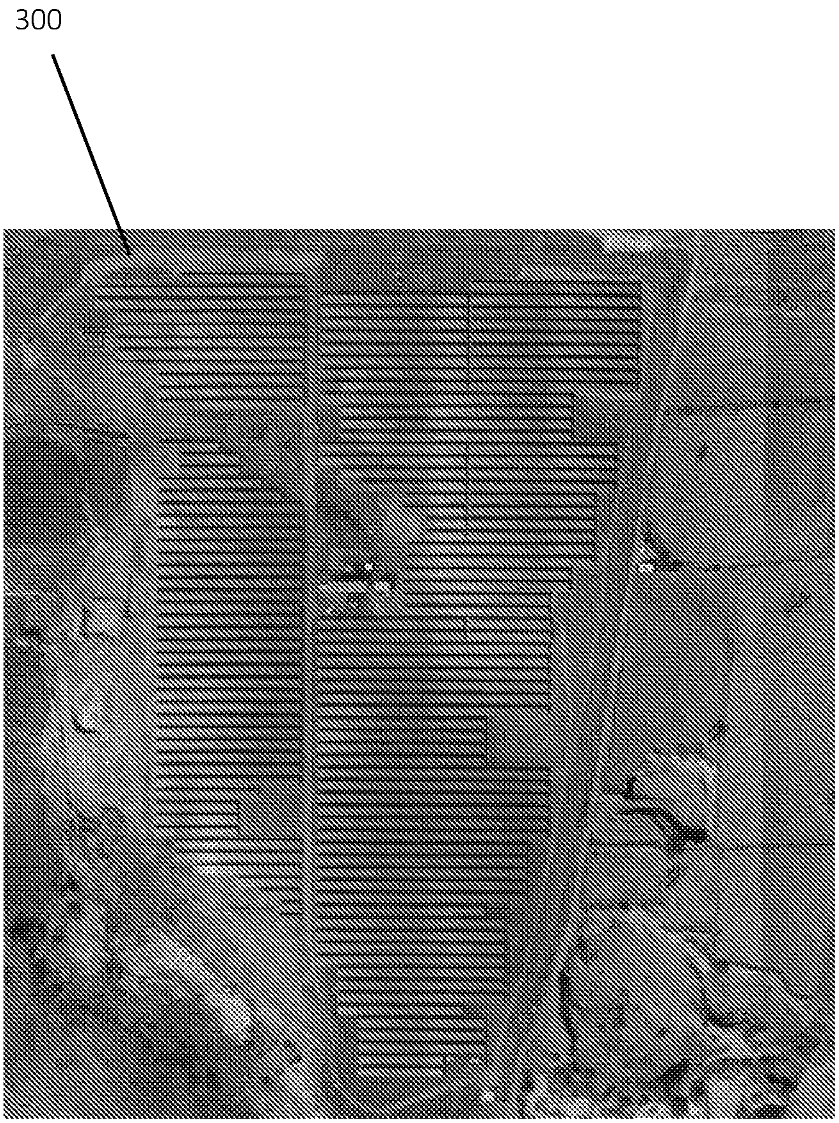
Figure 4:
Figure 5:
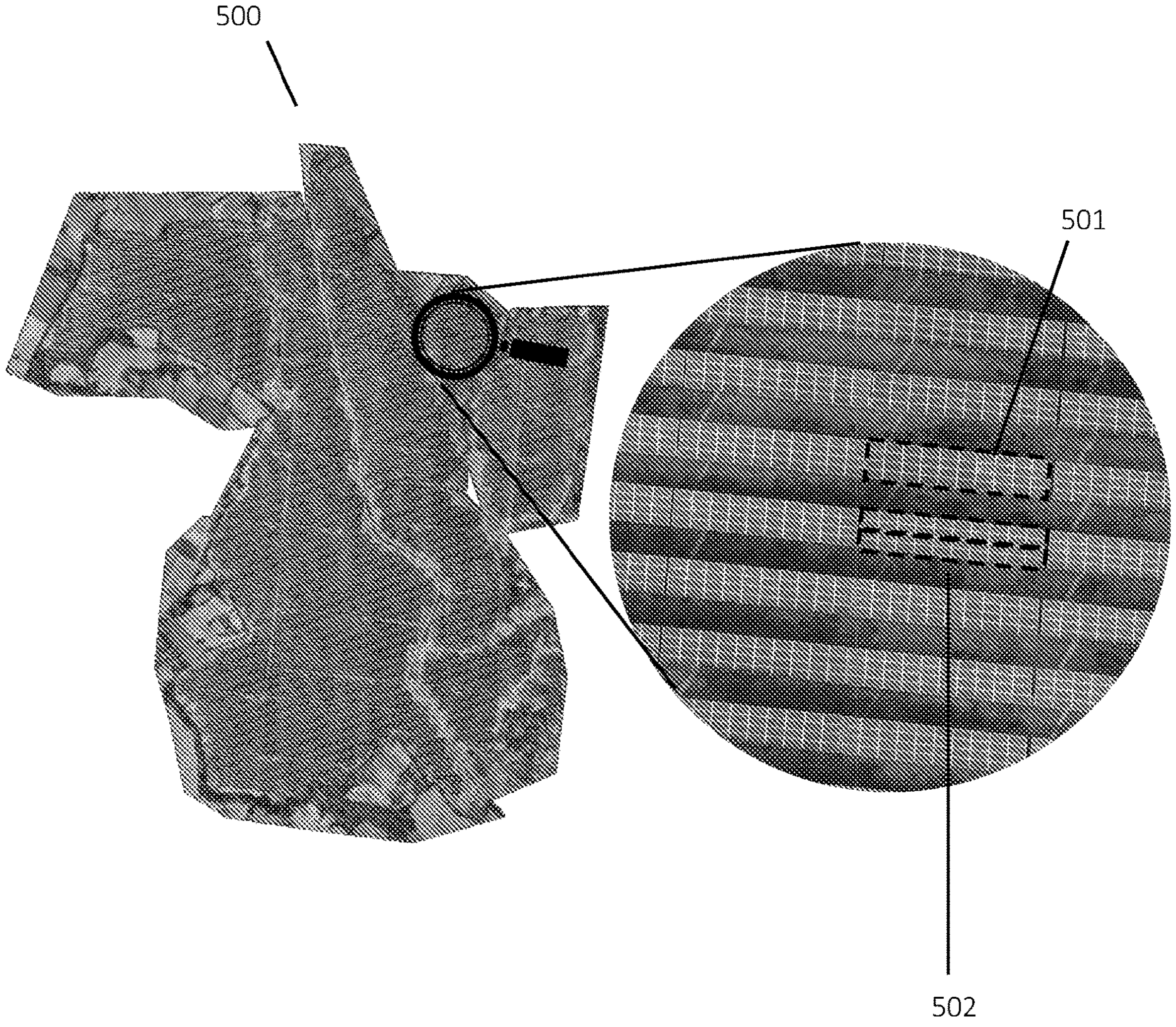
Figure 8:
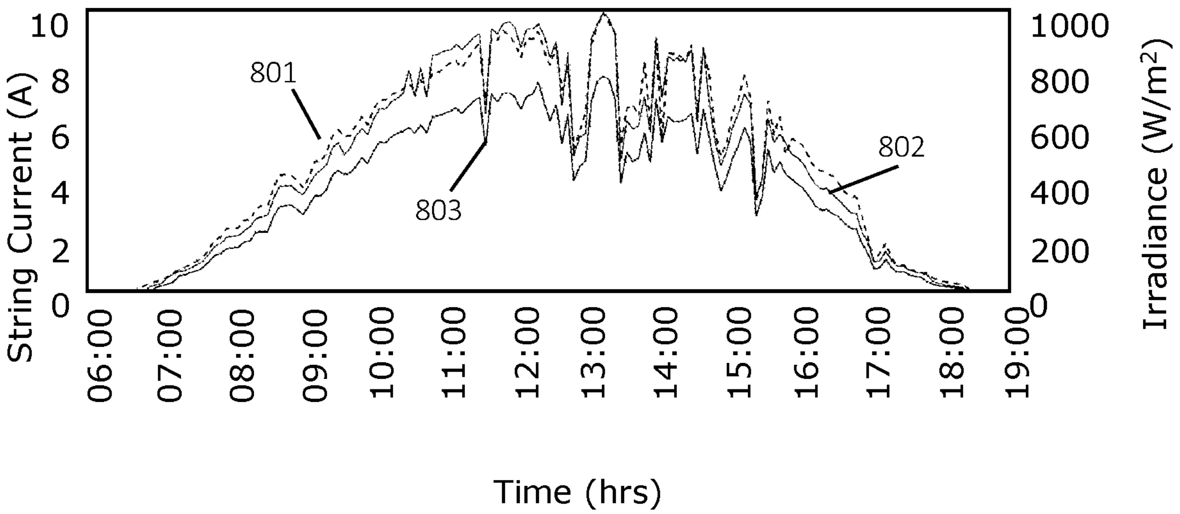
Figure 9:
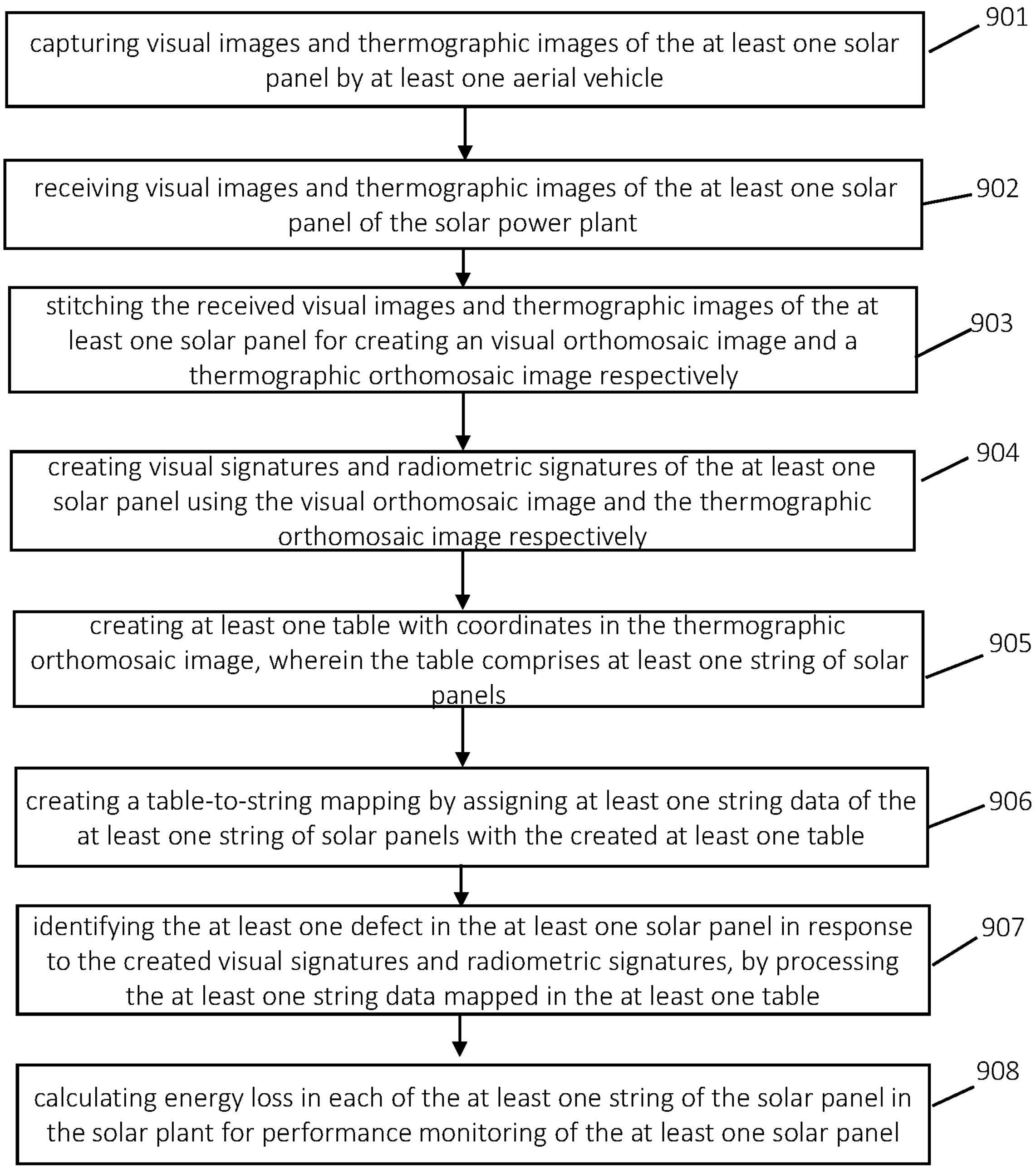

FIG. 3 is an illustration of a visual orthomosaic image of solar panels in a solar power plant, in accordance with an embodiment of the present disclosure;

FIG. 4 is an illustration of a thermographic orthomosaic image of the solar panels of the solar power plant, in accordance with an embodiment of the present disclosure;

FIG. 5 is an illustration of the table and strings in the table of a solar panels in the solar power plant, in accordance with an embodiment of the present disclosure;

FIGS. 6 and 7 are illustrations of the solar panel defects in accordance with an embodiment of the present disclosure;

FIG. 8 is a graphical representation of performance of strings, in accordance with an embodiment of the present disclosure; and FIG. 9 is a flow chart of a method of (for) detecting at least one defective solar panel of a solar power plant, in accordance with an embodiment of the present disclosure.

Table 1 demonstrates the results of Solar Thermal Analysis, in accordance with an embodiment of the present disclosure;

Table 2 demonstrates the results of Electrical Parameter Analysis, in accordance with an embodiment of the present disclosure;

Table 3 demonstrates the results of Table-to-String Static Mapping, in accordance with an embodiment of the present disclosure; and Table 4 demonstrates the combination of Tables 1, 2 and 3, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item to which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practising the present disclosure are also possible.

In an aspect, embodiments of the present disclosure relate to a system for performance monitoring of at least one solar panel of a solar power plant, the system comprises:

- at least one aerial vehicle to capture visual images and thermographic images of the at least one solar panel;
- a data-processing arrangement in communication with the at least one aerial vehicle via a communication network, wherein the data processing arrangement is configured to:
  - receive visual images and thermographic images of the at least one solar panel of the solar power plant;

stitch the received visual images and thermographic images of the at least one solar panel to create a visual orthomosaic image and a thermographic orthomosaic image respectively;

create visual signatures and radiometric signatures of the at least one solar panel using the visual orthomosaic image and the thermographic orthomosaic image respectively;

create at least one table with coordinates in the thermographic orthomosaic image, wherein the table comprises at least one string of solar panels;

create a table-to-string mapping by assigning at least one string data of the at least one string of solar panels with the created at least one table;

identify the at least one defect in the at least one solar panel in response to the created visual signatures and radiometric signatures, by processing the at least one string data mapped in the at least one table;

calculate energy loss in each of the at least one string of the solar panel in the solar plant for performance monitoring of the at least one solar panel.

In another aspect, embodiments of the present disclosure relate to a method of (for) performance monitoring of at least one solar panel of a solar power plant, the method comprising:

capturing visual images and thermographic images of the at least one solar panel by at least one aerial vehicle;

receiving visual images and thermographic images of the at least one solar panel of the solar power plant;

stitching the received visual images and thermographic images of the at least one solar panel for creating a visual orthomosaic image and a thermographic orthomosaic image respectively;

creating visual signatures and radiometric signatures of the at least one solar panel using the visual orthomosaic image and the thermographic orthomosaic image respectively;

creating at least one table with coordinates in the thermographic orthomosaic image, wherein the table comprises at least one string of solar panels;

creating a table-to-string mapping by assigning at least one string data of the at least one string of solar panels with the created at least one table;

identifying the at least one defect in the at least one solar panel in response to the created visual signatures and radiometric signatures, by processing the at least one string data mapped in the at least one table;

calculating energy loss in each of the at least one string of the solar panel in the solar plant for performance monitoring of the at least one solar panel.

The present disclosure provides the aforementioned system and a method of (for) performance monitoring of at least one solar panel of a solar power plant. The present disclosure provides an automated system for performance monitoring of a solar power plant, wherein the images of the solar panels are collected by the aerial vehicle including an unmanned aerial vehicle UAV or the aeroplane. The system disclosed herein is simple, robust, inexpensive, and allows automated monitoring of the solar power plant. It will be appreciated that the system efficiently uses the visual orthomosaic images and thermographic orthomosaic images to identify the defects like hotspot, vegetation, dirt/shadow, by-pass diode, hot string etc. The disclosed system accurately calculates and quantifies the energy loss associated with the at least one string of the solar panels. The system efficiently ensures detecting controllable and non-controllable losses in the at least one solar panel of the solar power plant.

In general, the term "solar power" refers to the energy from the sun that is converted into electricity either directly using photovoltaic (PV) cells, or indirectly using concentrated solar power, or their combination.

The term "solar power plant" or "solar plant" refers to an array of solar cells or photovoltaic (PV) cells that convert sunlight coming from the sun into electric energy using photovoltaic effect. Optionally, solar power plant refers to an array of PV modules, where each PV module is an assembly of PV cells mounted in a framework for installation. Optionally, the solar power plant may be connected to the grid to supply the generated electricity for household use. Optionally, the solar power plant may be connected to a particular industrial unit to fulfil the electricity requirements.

The term "aerial vehicle" of the present disclosure refers to an aircraft that is operated from a distance. In general, the aerial vehicle comprises unmanned aerial vehicle UAV, wherein the unmanned aerial vehicle can be operated from a distance without a person being present on it. In an embodiment, the aerial vehicle comprises of an aeroplane or a helicopter. In an example, the aerial vehicle incorporates characteristics, such as Ground Sample Distance—4 cm/pixel, Flight Speed—<4 m/s, Frontal image overlap—90% for thermal Images and 75% for visual images; and Side image overlap—65%. It will be appreciated that the above-mentioned characteristics of the aerial vehicle are well known features and are used in common general knowledge.

In an embodiment, the drones (UAV) include a plurality of cameras for capturing visual and thermographic images with radiometric information. Also, for large solar plants, the UAV/drones may be replaced with airplane(s). The UAV/drones or airplane has to follow predefined flight parameters such as height to ensure minimum required resolution, speed to ensure clear non-blur images and flight path to ensure that all solar panels of the solar plants are covered and also, there is a required amount of overlap in images that are being captured. The captured images (visual and thermographic images) are combined to create a stitched image i.e., a composite image, in form of an Orthomosaic image of the at least one solar panel of the solar plant. Further, using pre-trained computer vision models and 'object detection' techniques, defects in solar panels are detected. These defects belong to different categories such as—hotspot, bypass diode active, short circuit, module hot and so forth.

In an embodiment, the defect type of the solar panel is identified using at least one of techniques but not limited to by-pass diode active, module hot, dirt/shadow, string hot, hotspot, vegetation, module short circuit and string reverse polarity.

In an embodiment, using the available monitoring capabilities for at least one of: an inverter, String Monitoring Box, Weather stations, an instantaneous current and power parameters are captured for at least one of: inverter, String Monitoring Box, String level, irradiance from installed pyranometers. Further, under-performing components of the solar plant are detected and analysed using the abovementioned instantaneous parameters. Also, the percentage difference between a string and a reference string (the best performing string) may be determined using a combination of regression and clustering techniques.

The term "inverter" refers to an electronic circuit that converts direct current (DC) into alternating current (AC). Optionally, in solar power plants, an individual inverter may be attached to each PV module from the array of PV modules, wherein the array of PV cells produces direct current (DC) which is converted into alternating current (AC) using inverters. The direct current produced by the array of PV modules is the combination of individual PV modules connected to the individual inverters. More optionally, the output from several inverters may be combined and then fed to the grid. Optionally, the inverters may include converters which converts variable direct current outputs from a photovoltaic panel to alternating current of utility frequency that can be supplied to the commercial electric grid or can be used in a local off grid electrical network. Optionally, the inverters may include heavy capacity centralised inverters. Optionally, the inverters may include lower capacity string inverters. Optionally, the inverters may include even lower capacity micro inverters. Optionally, the inverters may include string monitoring boxes or any other device which has power measurement capabilities.

The term "weather stations" refers to the weather monitoring stations which monitor weather parameters such as solar radiation, other weather conditions such as wind velocity, wind direction, humidity, module temperature etc. Optionally, weather stations may calculate performance ratio (PR) of the solar power plant using all the captured data. Optionally, the weather stations may comprise solar radiation sensor, wind speed sensor, wind direction sensor, PV temperature sensor, ambient temperature & humidity sensor, irradiance sensor and so forth.

Optionally, the system measures attributes in respect of each inverter in solar modules. The term "attributes" refer to the physical variables or parameters. The attributes include, but not limited to, an irradiance, ambient temperature, voltage, current, power, energy and module temperature. Irradiance refers to the radiant flux (power) received by a surface per unit area. Ambient temperature is the air temperature of any object or environment where equipment is stored. Module temperature refers to the operating temperature of the PV module. The variation in operating temperature of the PV module may occur due to alteration of heat flow into and out of PV module which reduces the voltage of the module and thereby reducing the output power.

In accordance with the present disclosure, the term "visual images" throughout the present disclosure refers to images captured by the aerial vehicle. The visual images are the images captured by at least one camera of the aerial device. Optionally, the visual images comprise a mental image that is similar to a visual perception. Optionally, the visual image is a picture of the solar panel. Moreover, the term "thermographic images" throughout the present disclosure refers to an image of an object created by infrared radiation emitted from the object. The thermographic images, also known as "thermal images" are captured by thermographic cameras of the aerial vehicle. For creating the thermographic images, a process of thermal imaging is used. Thermal imaging is a method of improving visibility of objects in a dark environment by detecting the objects' infrared radiation and creating an image based on that information. In an embodiment, the system captures the thermographic image using the aerial vehicle and is sent to the data processing arrangement for processing the thermographic images.

Throughout the present disclosure, the term "orthomosaic images" refers to a photogrammetrically orthorectified image product mosaicked from an image collection, wherein the geometric distortion has been corrected and the imagery has been color balanced to produce a seamless mosaic dataset. In general, orthomosaics are large, map-quality image with high detail and resolution made by combining many smaller images called orthophotos. The present disclosure discloses visual orthomosiac images and thermographic orthomosaic images.

Throughout the present disclosure, the term "visual signatures" refers to a signature or an indication of an object that can be seen visually or through naked eye otherwise. For example, the visual signature comprises image/picture of a defect on solar panel that can be seen visually. The defects like vegetation on the solar panel, dirt/shadow on the solar panel can be seen by the visual signature associated with the corresponding pictures of vegetation and dirt.

Throughout the present disclosure, the term "radiometric signatures" refers to a signature or an indication of an object/defect that is produced using energy emitted form the object/defect. For example, the defects like hot spots, bypass diode and the like can be seen as radiometric signatures on the thermographic orthomosaic images. In general, for producing radiometric signatures, radiometric sensors are employed.

The term "data processing arrangement" as used herein relates to programmable and/or non-programmable components that, when in operation, execute one or more software applications for storing, processing and/or sharing of data. Optionally, the data processing module may include hardware, software, firmware or a combination of these, suitable for storing and processing various information and services accessed by the one or more user using the one or more user equipment. Optionally, the data processing module may include functional components, for example, a processor, a memory, a network adapter and so forth. For example, the data processing module can be implemented using a computer, a phone (for example, a smartphone), a local server, a server arrangement (such as, an arrangement of two or more servers communicably coupled with each other), a cloud server, a quantum computer and so forth. Furthermore, data processing module is communicably coupled to the display module, via a communication module. In an example, the communication module includes but is not limited to, a dedicated hardware and software module for communication, a cellular network, short range radio (for example, such as Bluetooth®), Internet, a wireless local area network, and an Infrared Local Area Network, or any combination thereof.

Optionally, the system comprises a database to store the information related to the captured visual images and thermographic images, table-to-string mapping, and measurement of parameters like current, power, voltage of the solar panels, and the calculated energy loss. The database may comprise, a data collection arrangement. The term "data collection arrangement" as used herein relates to programmable and/or non-programmable components that, when in operation, execute one or more software applications for measuring, obtaining, storing, or sharing of data. Optionally, the data collection arrangement can include, for example, a component included within an electronic communications network and an array of various sensors for measuring and obtaining wide variety of data. Furthermore, the data collection arrangement may include hardware, software, firmware or their combination, suitable for measuring, obtaining and sharing various information. Optionally, the data collection arrangement may include, but not limited to, a voltage sensor, a current sensor, an ambient temperature sensor, an irradiation sensor, a humidity sensor, tilt angle sensor, solar current sensor and so forth.

Furthermore, the data processing arrangement is communicably coupled to the aerial vehicle, via a communication network. In an example, the communication network includes but is not limited to, a dedicated hardware and software module for communication, a cellular network, short range radio (for example, such as Bluetooth®), Internet, a wireless local area network, and an Infrared Local Area Network, or any combination thereof.

Throughout the present disclosure, the term 'stitch' or 'stitching' or 'image stitching' refers to a process of overlapping two or more images taken at different viewpoints and different times to generate a wider viewing panoramic image. It consists of image registration and an image blending process. Stitching is done to achieve the combination of images with overlapping sections to create a single high-resolution image. It plays a vital role in malfunction or defect detection by digital image processing of thermographic and visual images.

Optionally, an image stitching tool is employed for stitching of the visual images and the thermographic images to respectively form the visual orthomosaic image and the thermographic orthomosaic image. The image stitching tool is a professional stitching tool, for example, Hugin, PTGui, Panoweaver 10, Auto stitch, Panorama Studio and the like.

Optionally, the visual images and the thermographic images of the at least one solar panel comprise at least one of: time stamp data and values for Yaw, Pitch and Roll. The term "time stamp data" refers to data type that is used for values that contain both date and time parts. The visual images and thermal images have time stamp data that disclose the time and date of the image captured by the aerial vehicle. Moreover, the terms "Yaw", "Pitch" and "Roll" are the rotational movements about the X, Y, and Z axis respectively of the aerial vehicle. In general, the rotation about the front-to-back axis is called 'roll', rotation about the side-to-side axis is called 'pitch', and rotation around the vertical axis is called 'yaw'. It will be appreciated that these values of yaw, pitch and roll are associated with the aircraft or flight movement of the aerial vehicle.

Optionally, the at least one table in the thermographic orthomosaic image is created with coordinates. The coordinates of the at least one table in the thermographic orthomosaic image are detected using a deep learning model. The deep learning model automatically identifies various tables in the orthomosaic image. The deep learning model is a computer model that works on deep learning. In general, in deep learning, a computer model learns to perform classification tasks directly from images, text, or sound.

Optionally, the at least one defect in the at least one solar panel comprises at least one of: Hotspot, Module Hot, Module Short Circuit, String Hot, Bypass Diode Active, Dirt, Shadow, Vegetation, Cable point Heating, String Reverse Polarization, Reflection.

Optionally, the at least one defect of the at least one solar panel is detected by processing the thermographic orthomosaic image using a defect detection model. The term "model" relates to a machine learning algorithm. Machine learning algorithm refers to a process or set of rules to be followed in calculations or other problem-solving operations, especially by a computer which uses historical data as input to predict new output values. Optionally, machine learning algorithms relates to a program with a specific way to adjusting its own parameters, based on the feedback received on its previous performance in making predictions about a dataset. Optionally, machine learning algorithms include: a K-nearest neighbour algorithm, a regression analysis, ensemble tree based algorithms, maximum power point tracking, a hidden Markov model, a gradient boost, a decision tree, an artificial neural network, a recurrent neural network, a long short-term memory algorithm, a generative adversarial or adaptive adversarial neural networks, a convolutional neural network or a deep convolutional neural network, a reinforcement learning algorithm, random forest algorithm, an adaptive annealing algorithm, support vector machines, a recommender system, genetic algorithm, Q learning and a deep Q-learning algorithm, wherein at least one adaptive learning algorithm or another suitable computational algorithm is implemented in a closed-loop system. The term "sub-models" refers to the models generated for every inverter and/or solar panel in the solar modules. Optionally, the model can be a deep learning model.

In an embodiment, the table-to-string mapping is created by assigning at least one string data of the at least one string of the solar panels with the created at least one table. Optionally, the table-to-string mapping is done manually using tools like MS Excel. Optionally, the table-to-string mapping is done automatically using automated softwares installed in the system.

Optionally, the energy loss in each of the at least one string of the solar panels is calculated by processing measurement parameters that comprises at least one of: power, current, voltage, in combination with at least one weather parameter.

Optionally, the data processing arrangement, when in operation, is further configured to use the calculated energy loss to detect and analyse under-performing components of the solar plant using instantaneous current and power for at least one of: the inverter, at least a string monitoring box of the solar power plant and the at least one string, and using a plane of array irradiance from a pyranometer installed in the solar power plant.

Optionally, the thermographic orthomosaic image identifies the at least one defect in the solar panels using pre-trained computer vision models and object detection techniques.

In an embodiment, the energy loss in each of the at least one string of the solar panel in the solar plant is calculated for performance monitoring of the at least one solar panel. Optionally, the energy loss is calculated by comparing a performance value of each of the at least one string with a performance value of a reference string for each of an inverter that is connected with the at least one string, wherein the performance value of the reference string is highest in the solar panel. This is done by Electrical parameter analysis as explained in detail later in the description.

System and method to identify defective solar panels and to quantify energy loss attributable to each of the defects in solar power plant through a combination of analytical and computer vision (artificial intelligence) techniques.

In an embodiment, the data processing arrangement, when in operation, is configured to implement analytical technique (s), such as but not limited to Electrical Parameters Analysis (EPA) and Solar Thermal Analysis (STA). The EPA entails measuring electrical and weather parameters such as string currents, solar irradiance and applying various machine learning algorithms on this time-series data. The STA utilises computer vision (artificial intelligence) techniques and entails taking large number of visual and thermographic images by drones (UAV) flying over a solar plant, combining these images to create visual and radiometric signatures and then using a combination of multiple object detection algorithms that individually detect each defects based on their visual signatures and radiometric signatures. These model are built by training the state of the art object detection model such as You-Only-Look-Once (YOLO) v4 using sample images collected by UAV for each defect. The innovation is not limited to this identified object detection model, but any new and emerging model can also be used for this purposes.

EPA analyses strings in a plant and identifies the under-performing strings by ranking them from worst to best. This is done by calculating the deviation (in %) of each string's current from the best-performing string for each day of the observation period. Strings are then ranked from high to low performing based on the average deviation, wherein the highest deviating string would be classified as the worst performing. The energy of each string is calculated with the Current and Voltage captured from the sensor. By multiplying the energy generated by the best string (e.g. 10 kWh per day) over say 30 days by the deviation (−10%), units of Energy lost are calculated (10 kWh per day*30 days*10%=30 kWh per month).

By mapping the EPA and STA, the system identifies defects in solar panels and defective solar panels. Also, further enables the system to quantify energy loss contributed by each of these defects in energy (kWh) terms.

The term "losses" as used herein relates to a temporary drop in the capacity of electric power generation or the actual drop in the electric power produced. Optionally, the losses may include thermal losses in the system and other system losses. Optionally, the losses may include light absorption losses, mismatch losses, voltage drop losses, shadow losses, clipping losses, curtailment losses, conversion losses and other parasitic losses. Optionally, the losses may include radiation losses, downtime losses, soiling losses and so forth. Optionally, the losses may include controllable losses and uncontrollable losses. Further, the term "controllable losses" as used herein relates to above-mentioned losses which can be controlled to increase the power generation and efficiency of the system which includes soiling losses, systemic losses, downtime losses etc. Furthermore, the term "uncontrollable losses" as used herein relates to above-mentioned losses which cannot be controlled to increase the power generation and efficiency of the system e.g. radiation losses or other losses occurred due to unfavourable weather conditions. The term "radiation loss" refers to the loss caused lower than expected radiation received from sun in the period under observation. The downtime loss in solar power plant occurs when the system or part thereof shuts or goes down typically due to a fault in one or more of the inverters. As a result, the entire set of solar panels running under the inverter are rendered useless. Energy generated by these solar panels goes completely waste because inverter is malfunctioning. The system may encounter downtime due to: congestion on the distribution system, shut-down of inverter as it detects an overvoltage due to lightning strike, gird electricity failure, detection of a ground fault. Soiling loss occurs due to the accumulation of dust, dirt, pollen and other obstructions on solar modules. Wind can lift dust from the ground into the air which is later dropped onto the modules. Thus, decreasing the absorbed solar irradiance which leads to a decrease in power output from the modules. The systemic loss is associated with the energy loss on the DC side—the solar panel side and would result from fault string wiring, damage in solar panels such as hot-spot, potential induced degradation, by-pass diode active, open-circuit connection, short circuit connection, physical damage to the panel such as delamination.

In an exemplary embodiment, as shown in Table-2, it is determined that String #5, connected to String Monitoring Box #1 connected to Inverter #10 (abbreviated as INV_10, SMB_01, STR_05) is underperforming by −1% when compared to INV_09, SMB_02, STR_01. We reference all other strings to INV_01, SMB_09, STR_09 as it is the best performing string in the entire plant.

In a specific embodiment, the insights generated from Solar Thermal Analysis and Electrical Parameters Analysis are combined to identify the faults and to quantify the energy loss contributed by each and every solar panel fault in the plant. This helps to not only understand the count of faults but also to make a decision whether correcting some of these faults is financially justifiable or not.

Specifically, the entire method includes: flying a drone or a small aircraft equipped with both regular (RGB camera) as well as thermographic camera to capture large number images from a certain height and with a certain minimum resolution; combining all the captured images (both normal as well as thermographic) to create a visual orthomosaic as well as radiometric orthomosaic and in orthomosaic, all the overlapping regions are removed; running an Object Detection Model to detect and label all the Tables in the solar plant; capturing a large number of captured images and from large number of plants, build a pre-trained Object Detection Model that detects solar panel defects as described above; running the slices of orthomosaic created in through the Object Detection Model as identified above. Further, the model detects various defects and draws a bounding box around these faults. Subsequently, the model identifies a Hot Spot at Table T_11_12 at row number 2 and column number 12 (as shown in Table 1 below). This is identification of defects in the physical dimension.

Further, going over to the electrical dimensions, the solar panels are grouped in Strings, that are in turn grouped in String Monitoring Boxes and that are in turn grouped in Inverters. Strings are being constantly monitored using current/voltage/power measurement devices at regular intervals of 1 minute or 5 minutes or so. Additionally, a weather station at the solar plant is also capturing weather data such as irradiation, ambient temperature, wind speed etc. at regular intervals. Using this data over a long period of time (typically around 15-30 days), we can create a sorted list of strings from best performing to worst performing along with the % difference of each string when compared to the best string in the plant. This entire process is termed as Electrical Parameters Analysis. At the end of this analysis, string INV_11, SMB_09, STR_04 is performing −9% below string INV_01|SMB_09|STR_09. We can create an entire table for all the strings in the plant, as shown below in Table 2.

Now by mapping each String in the plant to a Table (this process is manual as shown in Table 3), we establish a correlation between % loss as concluded in the Electrical Parameter Analysis and the defects/faults detected by the Solar Thermal Analysis as shown in Table 4.

Specifically, using the abovementioned analysis, it may be determine that String #4, connected to String Monitoring Box #9 connected to Inverter #11 (abbreviated as INV_11|SMB_09|STR_04) physically situated on Table T_13_14 is causing a loss of −72 kWh per month and this is due to defect type Bypass Diode on the solar panel situation on Row 3 and Column 11 of that Table.

Table 1 shows a typical output from the Solar Thermal Analysis. The analysis generated a defect type, physical table number along with row and column number within the table where defect is reported.

TABLE 1

| S. No. | Defect Type | Table Identifier in the Solar Plant | Row | Column |
|---|---|---|---|---|
| 1 | Hot Spot | T_11_12 | 2 | 12 |
| 2 | Bypass Diode | T_13_14 | 3 | 11 |
| 3 | Module Hot | T_15_16 | 1 | 10 |
| 4 | Module Short Circuit | T_17_18 | 2 | 9 |
| 5 | String Reverse Polarity | T_19_20 | 3, 4 | — |
| 6 | String Hot | T_21_22 | 3 | 8 |
| 7 | Hot Spot | T_23_24 | 4 | 7 |

Table 2 shows a typical output from the Electrical Parameter Analysis which identifies the best performing String in the plant and % difference between the best performing string and all other strings in the plant. As the comparison is being made with the best performing strings, all such numbers are always negative.

TABLE 2

| S. No. | String | Under Performance (%) | DC Capacity (kWp) | Energy Loss (kWh) per Month |
|---|---|---|---|---|
| 1 | INV_01 I SMB_09 I STR_09 | 0% | 7.2 | Not Applicable |
| 2 | INV_02 I SMB_08 I STR_05 | −1% | 7.2 | −8 |
| 3 | INV_03 I SMB_07 I STR_03 | −2% | 7.2 | −16 |
| 4 | INV_04 I SMB_06 I STR_08 | −3% | 7.2 | −24 |
| 5 | INV_05 I SMB_05 I STR_06 | −4% | 7.2 | −32 |
| 6 | INV_06 I SMB_04 I STR_07 | −5% | 7.2 | −40 |
| 7 | INV_07 I SMB_03 I STR_02 | −6% | 7.2 | −48 |
| 8 | INV_08 I SMB_02 I STR_01 | −7% | 7.2 | −56 |
| 9 | INV_09 I SMB_02 I STR_01 | −8% | 7.2 | −64 |
| 10 | INV_10 I SMB_01 I STR_05 | −9% | 7.2 | −72 |
| 11 | INV_11 I SMB_09 I STR_04 | −9% | 7.2 | −72 |

Table 3 shows a static map that links a String with a Table in the solar plant. This mapping is required only once for a plant. A table solar panel table) typically may contain 1 to 4 complete Strings.

TABLE 3

| Table | String | Position within Table |
|---|---|---|
| T_27_28 | INV_01 I SMB_09 I STR_09 | UPPER |
| T_15_16 | INV_02 I SMB_08 I STR_05 | LOWER |
| T_21_22 | INV_03 I SMB_07 I STR_03 | LOWER |
| T_25_26 | INV_04 I SMB_06 I STR_08 | UPPER |
| T_11_12 | INV_05 I SMB_05 I STR_06 | UPPER |
| T_23_24 | INV_06 I SMB_04 I STR_07 | LOWER |
| T_31_32 | INV_07 I SMB_03 I STR_02 | LOWER |
| T_29_30 | INV_08 I SMB_02 I STR_01 | LOWER |
| T_19_20 | INV_09 I SMB_02 I STR_01 | LOWER |
| T_17_18 | INV_10 I SMB_01 I STR_05 | UPPER |
| T_13_14 | INV_11 I SMB_09 I STR_04 | UPPER |

In an exemplary embodiment, combination the table 1, table 2 and table 3 into table 4 shows that each solar panel defect type and the energy loss contributed by each such defect. Also, certain Strings that report an under-performance at the string level but there is no corresponding defect type reported in Solar Thermal Analysis. This means that the under-performance in such Strings is not caused by module defects but other factors such as faulty or damaged string cabling or temporary shadows etc.

TABLE 4

| Table | String | Energy Loss (kWh) per Month | Fault Type |
|---|---|---|---|
| T_27_28 | INV_01 I SMB_09 I STR_09 | Not Applicable | None |
| T_15_16 | INV_02 I SMB_08 I STR_05 | −8 | Module Hot |
| T_21_22 | INV_03 I SMB_07 I STR_03 | −16 | String Hot |
| T_25_26 | INV_04 I SMB_06 I STR_08 | −24 | None |
| T_11_12 | INV_05 I SMB_05 I STR_06 | −32 | Hot Spot |
| T_23_24 | INV_06 I SMB_04 I STR_07 | −40 | Hot Spot |
| T_31_32 | INV_07 I SMB_03 I STR_02 | −48 | None |
| T_29_30 | INV_08 I SMB_02 I STR_01 | −56 | None |
| T_19_20 | INV_09 I SMB_02 I STR_01 | −64 | String Reverse Polarity |
| T_17_18 | INV_10 I SMB_01 I STR_05 | −72 | Module Short Circuit |
| T_13_14 | INV_11 I SMB_09 I STR_04 | −72 | Bypass Diode |

In an embodiment, the disclosed system further comprises representation of defects, string analysis, and report generation of the performance monitoring of the solar panels to a user on a user-interface via an Application Programming Interface (API). The interface shows All Faults Display that represents a visual orthomosaic image with rectangular boxes in different colors to highlight different types of defects. Moreover, the interface shows the graphical representation of performance of a string, displays string current and highlights defects in that string only. Optionally, the user-interface comprises but not limited to at least one of: a mobile phone, computer, tablet, laptop and the like.

Moreover, the present disclosure also relates to the method as described above. Various embodiments and variants disclosed above apply mutatis mutandis to the method.

Optionally, the visual images and the thermographic images comprise at least one of: time stamp data and values for Yaw, Pitch and Roll.

Optionally, the method comprises detecting the coordinates of the at least one table in the thermographic orthomosaic image using a deep learning model.

Optionally, the method comprises processing the thermographic orthomosaic image using a defect detection model to detect the at least one defect of the at least one solar panel.

Optionally, the at least one defect in the at least one solar panel comprises at least one of: Hotspot, Module Hot, Module Short Circuit, String Hot, Bypass Diode Active, Dirt, Shadow, Vegetation, Cable point Heating, String Reverse Polarization, Reflection.

Optionally, the method comprises calculating energy loss in each of the at least one string of the solar panels by processing measurement parameters that comprises at least one of: power, current, voltage, in combination with at least one weather parameter.

Optionally, the method further includes using the calculated energy loss to detect and analyse under-performing components of the solar plant using instantaneous current and power for at least one of: the inverter, at least a string monitoring box of the solar power plant and the at least one string, and using a plane of array irradiance from a pyranometer installed in the solar power plant.

Optionally, the method comprises calculating energy loss by comparing a performance value of each of the at least one string with a performance value of a reference string, wherein the performance value of the reference string is highest in the solar panel.

Optionally, the method comprises identifying the at least one defect in the solar panels using pre-trained computer vision models and object detection techniques by the thermographic orthomosaic image.

Additionally, the above-mentioned system and method may be used for performance monitoring of other non-conventional power plants. Such as performance monitoring of a windmill power plants, ocean wave energy harvesting plants and so forth.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural where appropriate.

DETAIL DESCRIPTION OF DRAWINGS

Referring to FIG. 1, there is disclosed a performance monitoring system (100) for at least one solar panel of a solar power plant. The system comprises an aerial vehicle (102) and a data processing arrangement (103). The aerial vehicle is coupled in communication with the data processing arrangement via a communication network (104).

Referring to FIG. 2, there is illustrated an exemplary solar power plant (200). The solar power plant comprises grid inter connection (201) connected with a grid (202). The solar power plant may be connected to the grid (202) to supply the generated electricity for household use. In general, the grid inter connection is a wide area synchronous grid that is a three-phase electric power grid having a regional scale or greater that operates at a synchronized utility frequency and is electrically tied together during normal system conditions. Optionally, the grid is a grid-connected photovoltaic system, or grid-connected PV system that is an electricity generating solar PV power system connected to a utility grid. A grid-connected PV system consists of solar panels, one or several inverters, a power conditioning unit and grid connection equipment. In FIG. 2, the array of solar cells produces direct current (DC) power which is converted to Alternating current (AC) using inverters (205). In an embodiment, the array of solar cells or the solar panels are arranged as strings (203). The strings are connected to the inverters through the string monitoring box (204). The string monitoring box SMB (204) is employed for monitoring parameters such as DC Current, DC Voltage, DC Disconnector Switch Status, DC power. The SMB also monitors SMB temperature.

Referring to FIG. 3, there is illustrated a visual orthomosaic image (300) of solar panels of a solar power plant.

Referring to FIG. 4, there is illustrated a thermographic orthomosaic image (400) of solar panels of a solar power plant. The thermographic orthomosaic images refer to images captured based on energy irradiated from an object, in present disclosure a solar panel. Thermographic imaging is a method of using infrared radiation and thermal energy to gather information about objects, in order to formulate images, even in low visibility environments. It is well known in the art that thermal imaging is based upon the science of infrared energy, which is emitted from all objects. This energy from an object is also referred to as the heat signature, and the quantity of radiation emitted tends to be proportional to the overall heat of the object. Thermal camera and thermal imagers are the devices employed for capturing such thermal images. Optionally, the thermal cameras and the thermal imagers comprise of heat sensor with the capacity to pick up temperature differences. In general, thermographic imaging is used to check the body temperatures, to check any defects in a temperature specific object. In an embodiment, the thermographic orthomosaic image (400) detects defects (401) in the solar panels.

Referring to FIG. 5, there is illustrated a visual orthomosaic image (500) of solar panels. FIG. 5 illustrates Table (501) and two Strings (502) in a table of a solar panel in the solar power plant. In general, table in solar panels refer to a collection of solar panels in at least one row and at least one column. In general, strings refer to series of solar panels connected together.

Figure 6A:
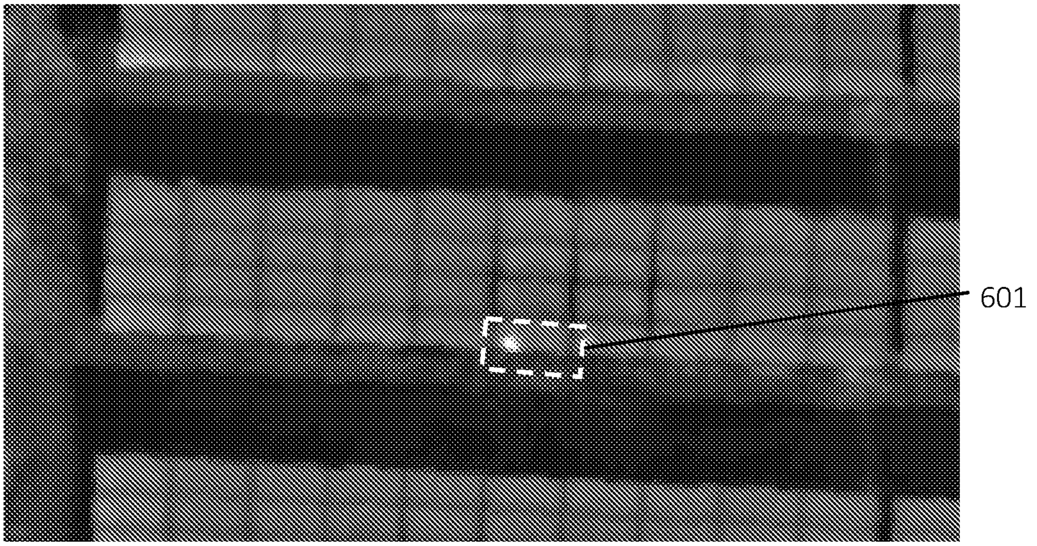
Figure 6B:
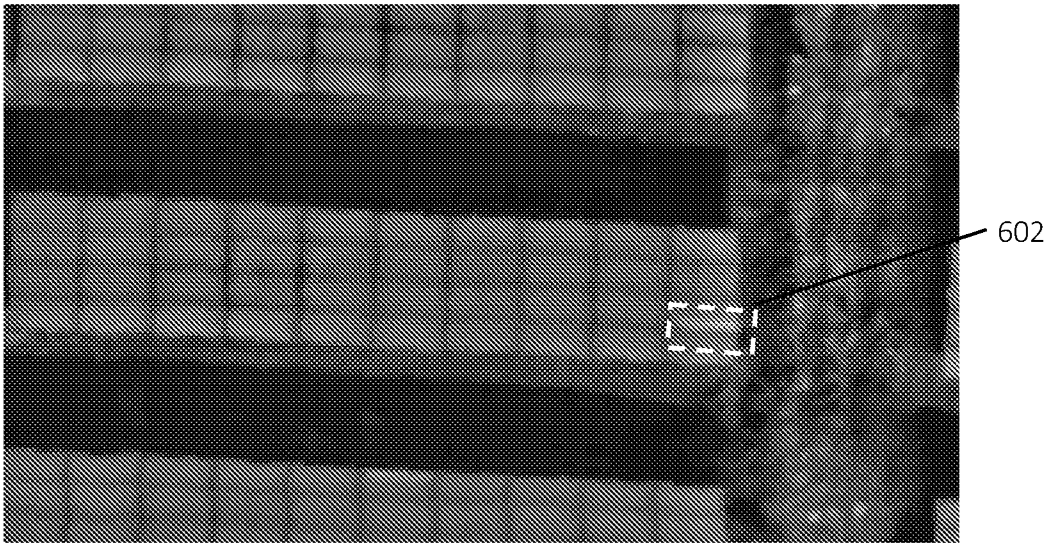
Figure 7A:
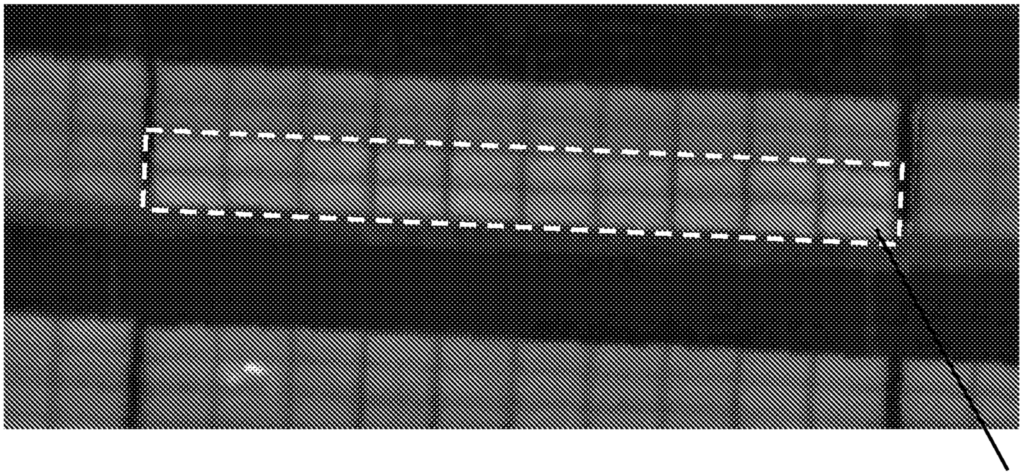
Figure 7B:
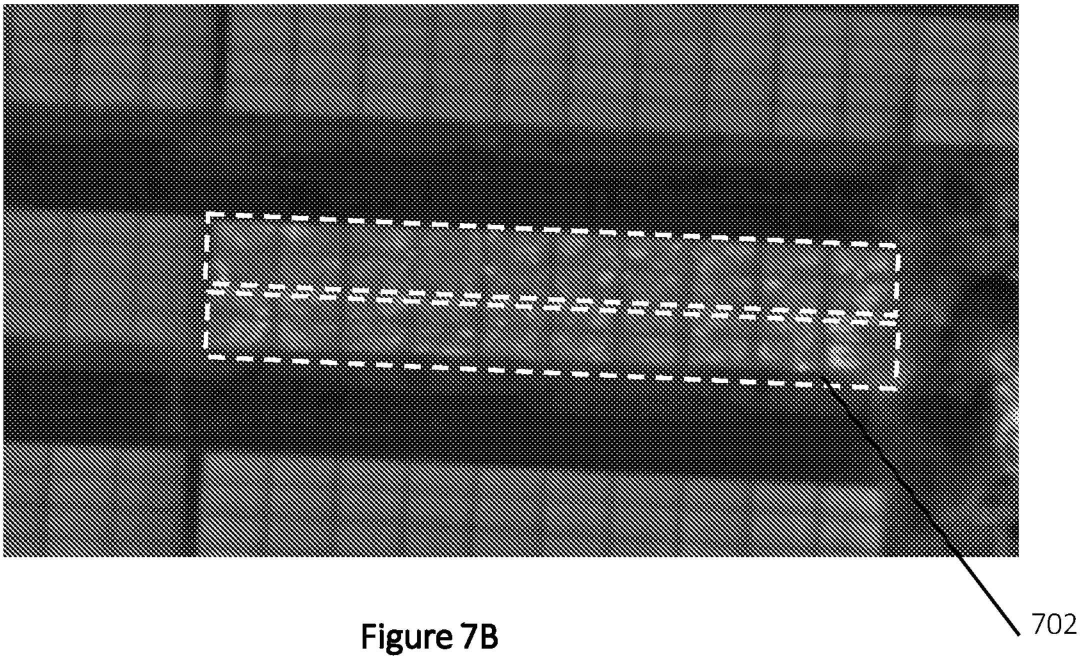

Referring to FIGS. 6 and 7, there is illustrated exemplary thermographic orthomosaic images of solar panels, showing various defects in the at least one solar panel. FIG. 6A illustrates the defect 'dirt/shadow' (601). FIG. 6B illustrates the defect 'by-pass diode' (602). FIG. 7A illustrates the defect 'string hot' (701). FIG. 7B illustrates the defect 'string reverse polarity' (702). The orthomosaic images can also illustrate other defects (not shown), such as module hot, module short circuit, vegetation, hotspot etc.

Referring to FIG. 8, there is illustrated a graphical representation of performance of at least one string. The graph plots the parameters such as the string current and the irradiance with respect to time. For example, the curve (801) represents irradiance of light on the solar panel. Optionally, the curve (802) represents the curve for Block2_INV1_SMB3. Optionally, the curve (803) represents the curve for Block5_INV3_SMB1. The Block here refers to string number as defined in the description below.

Referring to FIG. 9, there is represented a flow chart depicting a method for performance monitoring of at least one solar panel of a solar power plant. At step (901) visual images and thermographic images of the at least one solar panel are captured by at least one aerial vehicle. At step (902) visual images and thermographic images of the at least one solar panel of the solar power plant are received by the data processing arrangement coupled with the at least one aerial vehicle. At step (903) the received visual images and thermographic images of the at least one solar panel are stitched for creating an visual orthomosaic image and thermographic orthomosaic image. At step (904) visual signatures and radiometric signatures of the at least one solar panel are created using the visual orthomosaic image and thermographic orthomosaic image. At step (905) at least one table with coordinates in the thermographic orthomosaic image is created, wherein the table comprises at least one string of solar panels. At step (906) a table-to-string mapping is created by assigning at least one string data of the at least one string of solar panels with the created at least one table. At step (907) the at least one defect in the at least one solar panel is identified in response to the created visual signatures and radiometric signatures, by processing the at least one string data mapped in the at least one table. At step (908) energy loss in each of the at least one string of the solar panel in the solar plant is calculated for performance monitoring of the at least one solar panel.

The invention claimed is:

1. A system for performance monitoring of at least one solar panel of a solar power plant, the system comprises:

at least one aerial vehicle to capture visual images and thermographic images of the at least one solar panel;

a data-processing arrangement in communication with the at least one aerial vehicle via a communication network, wherein the data processing arrangement is configured to:

receive the visual images and the thermographic images of the at least one solar panel of the solar power plant;

stitch the received visual images and thermographic images of the at least one solar panel to create a visual orthomosaic image and a thermographic orthomosaic image respectively;

create visual signatures and radiometric signatures of the at least one solar panel using the visual orthomosaic image and the thermographic orthomosaic image respectively;

create at least one table with coordinates in the thermographic orthomosaic image, wherein the table comprises at least one string of solar panels of the solar power plant;

create a table-to-string mapping by assigning at least one string data of the at least one string of solar panels with the created at least one table;

identify at least one defect in the at least one solar panel in response to the created visual signatures and radiometric signatures, by processing the at least one string data mapped in the at least one table;

calculate energy loss in each of the solar panels of the at least one string of the solar panels in the solar power plant for performance monitoring of the at least one solar panel.

2. The system of claim 1, wherein the visual images and the thermographic images comprise at least one of: time stamp data and values for Yaw, Pitch and Roll.

3. The system of claim 1, wherein the coordinates of the at least one table in the thermographic orthomosaic image are detected using a deep learning model.

4. The system of claim 1, wherein the at least one defect of the at least one solar panel is detected by processing the thermographic orthomosaic image using a defect detection model.

5. The system of claim 1, wherein the at least one defect in the at least one solar panel comprises at least one of: Hotspot, Module Hot, Module Short Circuit, String Hot, Bypass Diode Active, Dirt, Shadow, Vegetation, Cable point Heating, String Reverse Polarization, Reflection.

6. The system of claim 1, wherein the energy loss in each of the at least one string of the solar panels is calculated by processing measurement parameters that comprises at least one of: power, current, voltage, in combination with at least one weather parameter.

7. The system of claim 6, wherein the data processing arrangement, when in operation, is further configured to use the calculated energy loss to detect and analyse under-performing components of the solar plant using instantaneous current and power for at least one of: the inverter, at least a string monitoring box of the solar power plant and the at least one string, and using a plane of array irradiance from a pyranometer installed in the solar power plant.

8. The system of claim 1, wherein the energy loss is calculated by comparing a performance value of each of the at least one string with a performance value of a reference string, wherein the performance value of the reference string is highest in the solar panel.

9. The system of claim 1, wherein the thermographic orthomosaic image identifies the at least one defect in the solar panels using pre-trained computer vision models and object detection techniques.

10. A method for performance monitoring of at least one solar panel of a solar power plant, the method comprising:

capturing visual images and thermographic images of the at least one solar panel by at least one aerial vehicle;

receiving the visual images and the thermographic images of the at least one solar panel of the solar power plant;

stitching the received visual images and thermographic images of the at least one solar panel for creating a visual orthomosaic image and a thermographic orthomosaic image respectively;

creating visual signatures and radiometric signatures of the at least one solar panel using the visual orthomosaic image and the thermographic orthomosaic image respectively;

creating at least one table with coordinates in the thermographic orthomosaic image, wherein the table comprises at least one string of solar panels of the solar power plant;

creating a table-to-string mapping by assigning at least one string data of the at least one string of solar panels with the created at least one table;

identifying at least one defect in the at least one solar panel in response to the created visual signatures and radiometric signatures, by processing the at least one string data mapped in the at least one table;

calculating energy loss in each of the solar panels of the at least one string of the solar panels in the solar power plant for performance monitoring of the at least one solar panel.

11. The method of claim 10, wherein the visual images and the thermographic images comprise at least one of: time stamp data and values for Yaw, Pitch and Roll.

12. The method of claim 10, wherein the coordinates of the at least one table in the thermographic orthomosaic image are detected using a deep learning model.

13. The method of claim 10, wherein the at least one defect of the at least one solar panel is detected by processing the thermographic orthomosaic image using a defect detection model.

14. The method of claim 10, wherein the at least one defect in the at least one solar panel comprises at least one of: Hotspot, Module Hot, Module Short Circuit, String Hot, Bypass Diode Active, Dirt, Shadow, Vegetation, Cable point Heating, String Reverse Polarization, Reflection.

15. The method of claim 10, wherein the energy loss in each of the at least one string of the solar panels is calculated by processing measurement parameters that comprises at least one of: power, current, voltage, in combination with at least one weather parameter.

16. The method of claim 15, wherein the method further includes using the calculated energy loss to detect and analyse under-performing components of the solar plant using instantaneous current and power for at least one of: the inverter, at least a string monitoring box of the solar power plant and the at least one string, and using a plane of array irradiance from a pyranometer installed in the solar power plant.

17. The method of claim 10, wherein the energy loss is calculated by comparing a performance value of each of the at least one string with a performance value of a reference string, wherein the performance value of the reference string is highest in the solar panel.

18. The method of claim 10, wherein the thermographic orthomosaic image identifies the at least one defect in the solar panels using pre-trained computer vision models and object detection techniques.

* * * * *